2,805,918
PROCESS OF SEPARATING ZINC FROM AMMONIACAL SOLUTIONS OF COPPER AND ZINC

George Van Hare, Jr., Brooklyn, N. Y., and Louis N. Allen, Jr., Short Hills, N. J.

No Drawing. Application November 10, 1952, Serial No. 319,782

4 Claims. (Cl. 23—61)

The present invention relates to the recovery of zinc from zinciferous materials containing other non-ferrous metals. More particularly, it is concerned with the precipitation of zinc values from leach liquors and/or process liquors obtained in treating such materials. Still more specifically, it deals with the precipitation of zinc or zinc compounds from ammoniacal-ammonium carbonate liquors containing other dissolved non-ferrous metals capable of forming complex ammines soluble in the liquor, particularly copper.

Because of the increasing demand for zinc and other non-ferrous metals, the commercial interest in their production and recovery by more efficient methods is also continually increasing. In recent years this has brought out a marked interest in hydrometallurgical treatments for the purpose. Unfortunately, these metals are seldom found separately from each other. This is true whether the source be ores, ore concentrates, secondary metals or industrial wastes or by-products.

Zinc in particular presents a difficult problem since in the common leaching liquors used in such methods it dissolves at substantially the same rate as copper. While this solution rate may be somewhat faster than that of cobalt or nickel, if these are present they also dissolve to some extent if zinc extraction is carried to completion. For the same reason silver, cadmium, lead and even iron may be dissolved to some extent, although in some cases the extent is limited by solubility considerations.

The problem may be readily illustrated in the recovery of zinc from brass, bronze and mixtures of them with copper scrap. Accordingly, this problem will be taken as illustrative.

In United States Letters Patent, Patent No. 2,695,843, issued November 30, 1954 to George Van Hare, one of the present inventors, conjointly with F. A. Schaufelberger and P. J. McGauley, and in other publications, it is pointed out that an efficient method of treating such secondary metals is to leach the solids with an ammoniacal-ammonium carbonate liquor containing dissolved copper and/or zinc salts. The latter are usually present as complex metal ammines. In that application it is pointed out that the leaching liquor should contain both sufficient ammonia and sufficient ammonium carbonate to hold the desired amounts of copper and/or zinc in solution. Further, it is pointed out that if the pregnant leach liquor is adjusted properly in these respects either a zinc product or a copper product may be initially taken and the other then recovered.

It is, for example, theoretically and actually possible, using a reducing gas at superatmospheric temperature and pressure, to precipitate substantially all of the copper from solution, either before or after taking a zinc product.

As a practical matter this is not feasible for economic reasons. For example, in good practice in leaching copper scrap in which there is little or no zinc, the leach liquor will contain per liter some 135–150 grams of copper, some 145–160 grams of $NH_3$ and some 100–200 grams of $CO_2$. However, the economic limitations on the time of treatment and the amount of autoclave space required to precipitate the 135 grams of copper with a suitable reducing gas, such as hydrogen or carbon monoxide, indicates that the copper should not ordinarily be reduced much below about 70 grams per liter in any one cycle. Consequently, the recycle liquor to the next leaching will comprise the end liquor with the $NH_3$ and $CO_2$ contents adjusted to about the limits above.

In treating a high-zinc content brass or similar scrap the pregnant leach liquor will seldom contain more than about 135 grams per liter of copper and in the first cycle at least will contain some 30 or less grams per liter of zinc. The $NH_3$ and $CO_2$ will be about the same as for copper leaching. The end liquor may contain some 70 or less grams per liter of copper, and the zinc. If the zinc content is not reduced in the next cycle, an additional 20 or 30 grams per liter of zinc will be picked up and presently the circuit will become overloaded with zinc.

A good recycle liquor should contain some 70 grams per liter of copper as determined by the economic considerations and some 10 or less grams per liter of zinc so that in the next cycle some 60–65 grams of copper and some 20 or more grams of zinc can be dissolved per liter.

It is apparent, then, that for efficient copper recovery, even if the zinc itself does not constitute a valuable product, the zinc content should be reduced in each cycle. Unfortunately, in depositing the copper metal, that amount of $NH_3$ which was associated with copper metal before deposition becomes available for solubilizing other materials and as a result the zinc cannot be readily precipitated unless this $NH_3$ is in some manner accounted for. In the above noted Van Hare et al. application, and in other proposals utilizing somewhat different circuits, this $NH_3$ is converted to ammonium carbonate by the addition of $CO_2$. This is done to reduce the $NH_3$ and increase the ammonium carbonate proportions to values at which zinc products can be precipitated. Subsequently both the $NH_3$ and $CO_2$ must be recovered for reuse.

While this method proved technologically satisfactory, it was found that by reducing the $NH_3$ content by conversion to ammonium carbonate and later driving off ammonia, the reconstitution of the ammonia became a very appreciable item in the overall cost. It is therefore the purpose of the present invention to devise a method in which the general circuit need not be radically altered but in which the excess $NH_3$ in the end liquor may be reduced to a value at which the dissolved zinc may be readily reduced to a desirable level by zinc precipitation. In general, this object is accomplished by controlled volatilization. It has been found, surprisingly, that this simple procedure can be carried out on the end liquors to remove the requisite amount of $NH_3$ to obtain a zinc product which is not appreciably contaminated by insoluble copper product, the latter problem being that which limited previous proposals.

The mechanics of the present invention are essentially simple. Zinc-bearing liquor, containing in the illustrative case copper, is subjected to heating in any suitable apparatus. In addition to zinc and copper present as complex ammine carbonates, presumably of the formulae $Zn(NH_3)_4CO_3$ and $Cu(NH_3)_2CO_3$, the liquor contains ammonium carbonate, ammonium hydroxide and water. Although it is not intended to limit the invention by any particular theory of operation, it appears that the zinc compound is somewhat less stable against heating than that of the copper, and it is believed that incipient precipitation of the zinc occurs on volatilization of substantially all ammonia and carbon dioxide not held by metal ammine complexes. The precipitate is designated herein as a basic zinc carbonate. Actually, it appears to be in the form of a basic zinc carbonate-ammonium carbonate double salt of the probable formula $$ZnO \cdot ZnCO_3 \cdot (NH_4)_2CO_3$$

which may be subsequently calcined to recover the $NH_3$ and $CO_2$. On contined heating, the less stable zinc complex undergoes a breakdown with resultant precipitation of the basic zinc compound and evolution of ammonia and carbon dioxide. Treatment is continued until the desired amount of zinc precipitate is obtained, or until the zinc content of the liquor is adjusted as desired.

While the general statement is simply made, in the operation of the process certain factors are important and should be considered. For example, volatilization may be simply accomplished by boiling the liquor. However, at temperatures above about 90° C., there is an increased tendency toward the breakdown of the complex copper ammine carbonate with resultant precipitation of a basic copper carbonate. Therefore, while boiling may be done, it is preferable to stay below about 90° C. wherever possible since the advantages of volatilization at higher rates at the higher temperatures may be offset by copper loss as zinc contaminant. On the other extreme, temperatures somewhat less than 60° C. may be used if so desired but are not as efficient. An optimum temperature range for precipitation of the zinc is about 60–90° C. To obtain the best results, the solution should be cooled to near room temperature before separation of the zinc precipitate from residual solution.

Precipitate is collected by filtration or some equivalent expedient and washed to remove any soluble components. In some cases, the precipitate as formed will contain minor amounts of copper but the amount and solubility thereof will be such that it is readily removed in the washing. Washing with water with a small amount of ammonium carbonate solution and again with water is to be preferred.

For optimum results, the copper content of the liquor should be in the cupric state. If the solution contains above about 20 grams per liter of cuprous copper prior to treatment it is desirable that the liquor be given a mild oxidation to convert at least the cuprous copper in excess of this amount to the cupric condition. This can be done in any desired manner, the exact method of oxidation forming no part of the present invention.

In general, volatilization may be summarized as follows. The zinc and copper-bearing liquor containing $NH_3$ in excess of that suitable for effective zinc precipitation is subjected to heating in any known per se manner to remove sufficient $NH_3$ so that copper up to about 70–75 grams per liter may be retained in solution but the zinc content will be reduced to less than 20, and preferably less than 10, grams per 70 grams of copper per liter, when cooled to process water temperatures. It is the ratio of zinc to copper in the cooled liquor which is controlling with respect to the end of the process and not necessarily the zinc or copper content at the end of $NH_3$ and $CO_2$ evolution. It is, therefore, meaningless to assign exact numerical limitations to the content of the liquor before cooling.

Moreover, the ratio of zinc to other metals, in the illustrative case copper, in the recycle liquor is a major economic factor. This applies both to effective leaching and effective zinc precipitation. It is necessary that enough zinc be precipitated to be equal to approximately the amount which will be dissolved along with copper in the next leaching cycle. Again, for the illustrative case discussed above, this would mean 75 grams or less of copper and not more than 20 grams of zinc, preferably not more than 10 in the recycle liquor. Translated back in terms of dissolved content of liquor, after cooling the zinc to other metals, in this case, copper, will be from about 1–4 to about 1–8, depending upon the zinc-copper ratio in the material to be leached and the economically optimum lower limit to which the copper content can be reduced during subsequent copper precipitation. Since the molecular weights of zinc and copper are substantially the same, it makes little difference whether the zinc copper ratios are considered on a molar or a weight basis.

The following examples will further illustrate the invention

EXAMPLE 1

One liter of ammoniacal-ammonium carbonate end liquor, after removal of product copper and containing copper and zinc salts, combined ammonia and carbon dioxide, is placed in a laboratory still and subjected to volatilization at an average temperature of 75° C. until a white precipitate forms. Resultant solution is cooled to nearly room temperature, filtered and the precipitate washed with saturated aqueous ammonium carbonate solution and dried. Illustrative analyses of original solution, filtrate and washed filter cake appear in the following Table I:

*Table I*

| | Vol. (ml.) | Gms./l. | | | | Total Mols $NH_3$ | | Total Mols $CO_2$ | |
|---|---|---|---|---|---|---|---|---|---|
| | | Cu | Zn | $NH_3$ | $CO_2$ | Calc. | Act. | Calc. | Act. |
| Head | 1,000 | 71.4 | 28.9 | 152.3 | 137 | | | | |
| Filtrate | 340 | 83 | 25.1 | 74.5 | 65.4 | 4.12 | 4.38 | 1.68 | 1.48 |
| Cake (percent) | | 15.2 | 31.7 | 13.1 | 19 | | | | |

Table I shows that total $NH_3$ and $CO_2$ calculated on the basis of 2 mols $NH_3$ per mol of Cu, 4 mols $NH_3$ per mol of Zn and 1 mol $CO_2$ for each mol of both Cu and Zn remaining in the filtrate is substantially the same as actually is present. This tends to substantiate the previously proposed theory that substantially the only $NH_3$ and $CO_2$ present during precipitation is that held by the metal ammines.

EXAMPLES 2–4

In order to demonstrate the efficacy of the process in separating zinc without excessive copper loss, the procedure of Example 1 is repeated with solutions having varying dissolved copper and zinc contents. Analyses of the original solutions, filtrates and precipitates appear in the following Table II:

*Table II*

| | Vol. (ml.) | Gms./l. | | | | Total Mols $NH_3$ | | Total Mols $CO_2$ | |
|---|---|---|---|---|---|---|---|---|---|
| | | Cu | Zn | $NH_3$ | $CO_2$ | Calc. | Act. | Calc. | Act. |
| Example 2: | | | | | | | | | |
| Head | 1,000 | 31.3 | 68.4 | 179 | 151 | | | | |
| Filtrate | 592 | 50.8 | 88.6 | 93.3 | 84.1 | 7.0 | 5.5 | 2.15 | 1.91 |
| Cake (percent) | | 0.3 | 47.7 | 9.9 | 21.7 | | | | |
| Example 3: | | | | | | | | | |
| Head | 1,000 | 34.9 | 72 | 192.2 | 136 | | | | |
| Filtrate | 375 | 85.8 | 32.4 | 83.5 | 84.4 | 4.7 | 4.9 | 1.85 | 1.92 |
| Cake (percent) | | 0.2 | 45.1 | 9.1 | 23 | | | | |
| Example 4: | | | | | | | | | |
| Head | 1,000 | 54.8 | 73.5 | 200.4 | 162 | | | | |
| Filtrate | 531 | 90.4 | 50.6 | 117.7 | 122.2 | 6.44 | 6.92 | 2.45 | 2.78 |
| Cake (percent) | | 0.01 | 43.8 | 10.5 | 24.1 | | | | |

We claim:

1. In a process of recovering zinc from zinciferous material containing copper, wherein said material is leached with ammoniacal-ammonium carbonate liquor to dissolve a finite amount of zinc in a solution containing at least 20 grams per liter of dissolved zinc, a larger amount of dissolved copper but less than about four times the amount of dissolved zinc, and $NH_3$ in excess of that required to hold said dissolved copper and dissolved zinc in solution; the improved method of treating said solution to selectively precipitate zinc values which comprises: oxidizing at least the dissolved cuprous copper in excess of about 20 grams per liter to cupric copper; heating resultant solution at from about 60° C. to about 90° C. for sufficient time to volatilize sufficient ammonia, carbon dioxide and water vapor therefrom to initiate precipitation of whitish substantially copper-free zinciferous solids; continuing said heating and precipitation for sufficient time to produce a residual weight ratio of dissolved zinc to dissolved copper of from about 1:4 to about 1:8; stopping said heating and collecting resultant precipitate in which zinc is substantially only metal.

2. A process according to claim 1 in which after heating resultant slurry is cooled to about ambient temperature before separation of the precipitate.

3. A process according to claim 1 in which substantially the same amount of zinc is precipitated during said heating as is dissolved during said leaching.

4. A process according to claim 1 in which heating is stopped before the resultant copper concentration reaches its saturation value.

References Cited in the file of this patent

UNITED STATES PATENTS

| | | |
|---|---|---|
| 585,943 | Waterhouse | July 6, 1897 |
| 654,804 | Rigg | July 31, 1900 |
| 1,157,153 | De Bechi | Oct. 19, 1915 |
| 1,200,996 | Soderlund | Oct. 10, 1916 |
| 1,204,843 | Bretherton | Nov. 14, 1916 |
| 1,409,607 | Stevens | Mar. 14, 1922 |
| 1,579,302 | Gidden | Apr. 6, 1926 |
| 1,785,247 | Burkey | Dec. 16, 1930 |
| 1,854,664 | Ogden | Apr. 19, 1932 |
| 1,906,534 | Burke | May 2, 1933 |
| 2,131,312 | Colton | Sept. 27, 1938 |
| 2,616,781 | Forward | Nov. 4, 1952 |